US009648883B2

(12) United States Patent
Piezel et al.

(10) Patent No.: US 9,648,883 B2
(45) Date of Patent: May 16, 2017

(54) METHOD OF PRODUCING BAKERY PRODUCTS, SUCH AS BATCH BREADS, AND BAKED PRODUCTS THUS OBTAINED

(75) Inventors: Xavier Piezel, Randan (FR); Jean-Luc Thiaudiere, Mozac (FR)

(73) Assignee: Jacquet Panification, Saint Beauzire (FR)

( * ) Notice: Subject to any disclaimer, the term of this patent is extended or adjusted under 35 U.S.C. 154(b) by 663 days.

(21) Appl. No.: 12/447,119

(22) PCT Filed: Oct. 30, 2007

(86) PCT No.: PCT/EP2007/061659
§ 371 (c)(1),
(2), (4) Date: Jul. 7, 2009

(87) PCT Pub. No.: WO2008/052983
PCT Pub. Date: May 8, 2008

(65) Prior Publication Data
US 2009/0291165 A1 Nov. 26, 2009

(30) Foreign Application Priority Data
Oct. 30, 2006 (FR) ..................... 06 09527

(51) Int. Cl.
A21D 8/06 (2006.01)
A21B 3/13 (2006.01)
A21B 3/18 (2006.01)

(52) U.S. Cl.
CPC ............. *A21D 8/06* (2013.01); *A21B 3/133* (2013.01); *A21B 3/139* (2013.01); *A21B 3/18* (2013.01)

(58) Field of Classification Search
CPC .......... A21D 8/06; A21B 3/139; A21B 3/133; A21B 3/18
USPC .......... 426/243, 19; 219/725, 730, 757, 759, 219/760; 99/337, 347, 351, 355, 386
See application file for complete search history.

(56) References Cited

U.S. PATENT DOCUMENTS

| 254,770 | A | * | 3/1882 | Hurd | 99/450 |
| 1,488,252 | A | * | 3/1924 | House | 426/478 |
| 2,087,912 | A | | 7/1937 | Horlebeck et al. | |
| 3,318,263 | A | * | 5/1967 | Jeffery | 425/261 |
| 3,332,370 | A | * | 7/1967 | Brastad | 426/243 |
| 3,442,229 | A | * | 5/1969 | Dunn | 426/389 |
| 3,881,403 | A | * | 5/1975 | Ingram et al. | 99/338 |
| 4,157,403 | A | * | 6/1979 | Schiffmann et al. | 426/234 |
| 4,176,591 | A | * | 12/1979 | Power | 99/430 |
| 4,318,931 | A | * | 3/1982 | Schiffmann et al. | 426/243 |
| 4,371,329 | A | * | 2/1983 | Steels | 425/437 |
| 4,419,374 | A | * | 12/1983 | Pei | 426/243 |
| 4,431,397 | A | * | 2/1984 | Fried et al. | 425/384 |
| 4,587,075 | A | * | 5/1986 | Butcher et al. | 264/573 |
| 4,590,078 | A | | 5/1986 | Umina | |
| 4,877,932 | A | * | 10/1989 | Bernstein et al. | 219/730 |
| 5,129,810 | A | * | 7/1992 | Nakagaki | 425/422 |
| 5,331,135 | A | | 7/1994 | Ovadia | |
| 5,334,402 | A | * | 8/1994 | Ovadia | 426/241 |
| 5,902,621 | A | * | 5/1999 | Beckett et al. | 426/279 |
| 5,945,022 | A | * | 8/1999 | Volpe et al. | 219/707 |
| 6,004,596 | A | | 12/1999 | Kretchman et al. | |
| 6,359,272 | B1 | * | 3/2002 | Sadek et al. | 219/732 |
| 6,476,368 | B2 | * | 11/2002 | Aronsson et al. | 219/730 |
| 6,579,546 | B1 | * | 6/2003 | Jahnke | 426/19 |
| 6,627,862 | B1 | * | 9/2003 | Pedersen | 219/730 |
| 2003/0008050 | A1 | * | 1/2003 | Kraklow et al. | 426/551 |
| 2003/0148010 | A1 | | 8/2003 | Keese et al. | |
| 2004/0062839 | A1 | * | 4/2004 | Pedersen | 426/110 |
| 2004/0234653 | A1 | * | 11/2004 | Cogley et al. | 426/107 |
| 2005/0184066 | A1 | * | 8/2005 | Brooks et al. | 219/730 |
| 2008/0254286 | A1 | * | 10/2008 | Kuno et al. | 428/352 |

FOREIGN PATENT DOCUMENTS

| BE | 720 509 | | 3/1959 | | |
| FR | 2 356 372 | A1 | 1/1978 | | |
| FR | 2 397 154 | A1 | 2/1979 | | |
| FR | 2 496 537 | A1 | 6/1982 | | |
| FR | 2643545 | A1 | * 8/1990 | ............... | A21B 3/13 |
| GB | 1245476 | A | * 9/1971 | | |
| GB | 1 533 970 | A2 | 11/1978 | | |
| GB | 1533969 | | 11/1978 | | |

(Continued)

OTHER PUBLICATIONS

EPO translation of BE 720 509 A (J. Rahm, 1969).*
English Muffin Recipe (Aug. 5, 2005) available at http://www.food.com/recipe/english-muffin-bread-with-variations-microwave-134589.*
EPO translation of FR 2 397 154 (1979).*
Crustless Bread for Kids (2002) available at http://www.shortnews.com/start.cfm?id=21013.*
"DuPont" Mar. 8, 2005 http://www.newmaterials.com/News_Detail_Dupont_2753.asp#axzz39AyPEYik.*

(Continued)

*Primary Examiner* — Viren Thakur
(74) *Attorney, Agent, or Firm* — James C. Lydon

(57) ABSTRACT

A method of producing bakery products, more particularly sandwich loaves or the like. The method consists essentially in preparing a dough, optionally, in fermenting said dough, in placing the dough in a mold, in performing at least one step of baking the dough present in the mold by means of microwaves, optionally, in performing another step of baking by other baking means, in detaching the resulting baked product from the walls of the mold, optionally, in cooling the baked product and/or the mold, and in demolding the baked product. The method is an effective, high-performance method of producing breadmaking products, notably crustless batch breads, by microwave baking, which is reliable, simple, inexpensive and give satisfaction in terms of industrial production and organoleptic quality.

13 Claims, No Drawings

(56) References Cited

FOREIGN PATENT DOCUMENTS

| GB | 2134636 A | * | 8/1984 | |
|---|---|---|---|---|
| JP | 5917190 S | | 5/1984 | |
| JP | 2004 242591 A2 | | 9/2004 | |
| SU | 533368 A | * | 11/1976 | |
| WO | 90/00001 A2 | | 6/1989 | |
| WO | WO 2005092587 A1 | * | 10/2005 | ............. B29C 33/38 |

OTHER PUBLICATIONS

PCT/EP2007/061659 International Search Report Dated Apr. 25, 2008 and Written Opinion.

English Translation of Written Opinion of the International Searching Authority; PCT/EP2007/061659, filed Oct. 30, 2007; Jacquet Panification.

* cited by examiner

METHOD OF PRODUCING BAKERY PRODUCTS, SUCH AS BATCH BREADS, AND BAKED PRODUCTS THUS OBTAINED

The field of the invention concerns the preparation, and more especially the baking and the demolding, of bakery products, and in particular batch breads or the like.

Conventionally, the production of a bread comprises:

- a step of preparing the dough, comprising the operation of mixing the traditional ingredients, i.e., in particular, flour, water, sugar, yeast, fat and breadmaking additives; and also kneading, shaping and rounding operations,
- a fermentation step carried out, for example, at 35° C. and which enables, for example in 1 h 30, an increase in volume of the dough according to a multiplying factor, e.g. of three,
- and a baking step in conventional bakery ovens, optionally equipped with convection means.

The baking step is carried out at temperatures of the order of 150 to 240° C., for periods of approximately 10 to 60 min. It is possible to inject steam into the oven at the beginning of baking in order to moisten the surface of the bread and to thus delay the formation of the crust. The baking is subsequently continued in an atmosphere which is not saturated with steam, in order to allow satisfactory formation of the crust at the surface of the bread.

It could be advantageous, in certain cases, to substitute microwave baking for conventional baking carried out, for example, in convection ovens.

From the industrial point of view, microwave baking could possibly enable baking methods to be simplified, or even savings to be made, in particular in terms of energy consumption. In addition, industrial microwave baking could make it possible to gain access to new bakery products.

Up until recently, this microwave baking for industrial bakeries was coming up against a certain incompatibility of the metal molds with this type of baking.

Metal molds are not completely unacceptable for microwave baking. Productions comprising microwave baking of bread in metal molds have, moreover, been known for approximately ten years in the industrial baking field. This being the case, the loss of power due to the metal mold is such that this significantly reduces the economic value of this microwave baking.

However, new thermal polymers that are resistant to high temperatures, in particular high-temperature polyesters such as those manufactured and marketed by the company DuPont under the name "THERMX® PCT POLYESTER", have recently appeared on the market. This is a polyester based on poly(cyclohexylene-dimethylene terephthalate). This type of polymer withstands temperatures reaching 250° C.

Molds made of PCT THERMX® have thus been developed and produced by the Belgian company UBW. Such heat-resistant or thermal polymer molds constitute an advantageous substitute for metal molds, enable energy savings to be made by virtue of a reduction in baking times or temperatures, do not corrode over time, are lighter, and therefore easier to handle, and have a rigid structure resistant to the deformation that can be caused by the increase in volume due to fermentation.

However, the microwave baking of breadmaking products is not without technological problems. It is in fact, to date, very difficult to obtain, by microwave baking, breadmaking products of comparable and/or acceptable quality compared with the standard products.

In particular, the physicochemical and mechanical characteristics of the bread, emerging from the microwave baking, are such that the bread is extremely fragile as the soft part is not set firm, thereby preventing easy mechanical demolding suitable for industrial requirements. Furthermore, the bread adheres strongly to the mold, thereby even further complicating demolding.

Moreover, there is a need to optimize the conditions for microwave baking of breadmaking products, in particular of batch breads or the like, especially when the molds used are molds made of heat-resistant polymer.

In addition, the breadmaking product market is currently experiencing a tendency corresponding to an increasingly marked interest, on the part of consumers, in crustless breads, in particular crustless batch breads. These crustless breadmaking products are particularly well-liked by children.

These crustless batch breads can be obtained from batch breads produced with a crust which is subsequently removed, for example using cutting means such as an electric blade slicer, a crust remover, a water jet, a laser or a punch.

An alternative is to provide a method of baking which makes it possible to prevent the formation of the crust. U.S. Pat. No. 2,087,912 describes a method for baking a crustless bread in a closed receptacle, said method consisting in subjecting the dough placed in said receptacle to heat for a period of time sufficient to bake the dough and in absorbing a portion of the vapors and gases given off by the bread during the baking.

French patent FR-B-2 496 537 describes a machine for automatically cutting off the crust of slices of breadmaking products U.S. Pat. No. 6,004,596 relates to a sandwich composed of two slices of crustless batch bread, sealed in such a way that the filling, composed of peanut butter and jelly, does not leak out.

To date, none of the known used methods makes it possible to propose breadmaking products, in particular crustless batch breads, or the like, that give satisfaction in terms of industrial production and organoleptic quality.

In this context, one of the essential objectives of the present invention is to provide an effective, high-performance alternative method of producing breadmaking products by microwave baking, which method should, moreover, be reliable, simple and inexpensive.

Another essential objective of the invention is to provide a method of producing breadmaking products by microwave baking, in which the demolding step can be easily carried out, in particular on the industrial scale, without damaging the integrity of the bakery product obtained after baking at least in part by microwave.

Another essential objective of the invention is to provide a method of production by microwave baking which makes it possible to obtain breadmaking products, in particular crustless batch breads or the like, said products having to have an attractive appearance, to have good organoleptic qualities and to have a low cost price.

These objectives, among others, are achieved by virtue of the present invention, which relates first of all to a method of producing bakery products, in particular batch breads or the like, characterized in that it consists essentially:

in preparing a dough, optionally, in fermenting said dough, in placing the dough in a mold
which is made from a heat-resistant plastic polymer, preferably a high-temperature polyester based on poly(cyclohexylene-dimethylene terephthalate);
and which is provided with means for evacuating the steam produced during and after the baking,
in performing at least one step of baking the dough present in the mold by means of microwaves,
optionally, in performing another step of baking by other baking means, such as conventional heating means (bakery ovens, for example convection ovens),
in detaching the resulting baked product from the walls of the mold,
optionally, in cooling the baked product and/or the mold, and in demolding the baked product.

Preferably, the step of baking by means of microwaves consists essentially in applying a total baking power of between 70 Wh/kg and 110, preferably between 75 Wh/kg and 85 Wh/kg, ideally divided up into two baking phases.

Even more preferably, the step of baking by means of microwaves consists:
in carrying out a phase 1 of baking the dough present in the mold by means of microwaves with a nominal power P1:
such that the emission power Pe1 (expressed in watts/min/gram of dough) is between $10^{-3}$ and $10^{-1}$, preferably between $1\times10^{-2}$ and $3\times10^{-2}$, and even more preferably between $1.5\times10^{-2}$ and $5.5\times10^{-2}$;
or such that the emission power Pe1 (expressed in watt-hours/kilogram of dough) is between 10 Wh/kg and 40 Wh/kg, and even more preferably between 12 Wh/kg and 30 Wh/kg;
in subsequently carrying out a phase 2 of baking by means of microwaves with a nominal. power P2:
such that the emission power Pe2 (expressed in watts/min/gram of dough) is between $10^{-3}$ and $10^{-1}$, preferably between $1\times10^{-2}$ and $7\times10^{-2}$, and even more preferably between $1.5\times10^{-2}$ and $8.5\times10^{-2}$;
or such that the emission power Pe2 (expressed in watt-hours/kilogram of dough) is between 30 Wh/kg and 100 Wh/kg, and even more preferably between 55 and 75 Wh/kg;
given, moreover, that P1≤P2.

First of all, it is to the inventors' credit to have understood that the difficulties in demolding that may occur in the context of microwave baking of bread are at least in part linked to the production of steam during and after baking, in particular during the slow cooling phase. In fact, unlike conventional baking, the inventors observed that the evaporation of water during the baking phase was minimal, whereas it was very substantial during the slow cooling phase. The inventors also observed that the increase in temperature, generated by the microwaves, results in evaporation of the water present in the dough. This water, in the form of steam, saturates the cold air of the microwave oven, but especially the very small space between the dough and the walls of the mold, which are naturally at a lower temperature due to the fact that they are made of a heat-resistant plastic polymer, preferably a high-temperature polyester based on poly(cyclohexylene-dimethylene terephthalate). The steam generated during and immediately after the baking condenses on the walls of the mold and forms, with the starch present in the dough, a starch paste which acts as an adhesive opposing demolding.

Moreover, it is advantageous to use a mold made, according to a bulk structure (in particular nonfibrous structure), of a heat-resistant plastic polymer, preferably by molding. It is a block, for example nonfibrous, material which is neither a fabric nor a knit nor a nonwoven that is a composite. The optional perforations are made in this solid-wall mold.

One of the keys of the method is to use a mold provided with means for evacuating the steam.

Preferably, these evacuating means comprise perforations distributed homogeneously over at least a portion of the walls of the mold, and preferably over all the walls. More particularly, the perforations of the walls represent, as % of the total wall surface, between 0.1 and 10, preferably between 1 and 5, and even more preferably between 1.5 and 2. Advantageously, the perforations are made in all or a portion of the edges of the mold, preferably at a rate of one perforation every 4 cm+/−0.5, and even more preferably every 2.0 cm+/−0.5, or every 1.5 cm+/−0.5. Similarly, the perforations may be made in the walls of the mold at a rate of one perforation every 2 cm+/0.5 along the length of the wall and every 1 cm+/−0.5 along the height of the mold. The perforations may preferably have a diameter of between 2 and 5 mm or between 1 and 2 mm, preferably substantially equal to 3 mm or to 2 mm. The perforations make it possible first of all to promote the evacuation of steam during baking.

Advantageously, the resulting baked product is detached from the walls of the mold by means of a pressurized gas jet.

The detaching gas jet, preferably air jet, can be sent out at a pressure (in bar) of greater than or equal to 2, preferably greater than or equal to 3, and even more preferably between 4 and 7.

The compressed air jet is applied to all the faces of the mold as soon as it comes out of the oven, and due to the perforations, this air jet and/or this air stream promotes the detachment of the baked product from the walls of the mold.

Notably, the baked product and/or the mold is (are) cooled by means of a pressurized gas jet and/or by means of a ventilation system which diffuses a stream of air.

The cooling gas jet, preferably air jet, can be sent out, for example, at a pressure (in bar) of less than or equal to 5, preferably less than or equal to 4, and even more preferably between 1 and 3.

The ventilation system should be sufficiently powerful. It may be located opposite the side faces and/or the bottom face of the mold.

The cooling air jet and/or air stream is (are) applied so as to wash against all the faces of the mold and to create lateral air currents which will facilitate the evacuation of the steam escaping from the perforations provided in the mold, and thus to facilitate cooling of the bread in the mold. As a result, the formation of the starch paste is prevented and demolding of the product is promoted. The accelerated cooling of the product also makes it possible to accelerate the handling of the latter.

Moreover, it is also to the inventors' credit to have developed a protocol comprising an optimized baking step which makes it possible to produce baked breadmaking products, in particular batch breads or the like, which have excellent organoleptic properties and have in particular a pleasant texture, or even, according to one specific embodiment, no crust. The breads obtained show a satisfactory development volume. They have a good strength and a pleasant taste, feel and appearance. The texture of these breads obtained by means of microwaves may be particular in terms of flexibility. This makes it possible to obtain bread slices that can be rolled up on themselves.

One of the keys of the optimization of the baking step is to have proposed:
using a total power of between 70 Wh/kg and 110 Wh/kg, preferably between 75 and 85 Wh/kg and, preferably, having recourse to a progressive baking sequence with nominal set powers such that P1≤P2 and emission powers Pe1 and Pe2 defined as follows:

Pe1:
(expressed in watts/min/gram of dough) is between $10^{-3}$ and $10^{-1}$, preferably between $1 \times 10^{-2}$ and $3 \times 10^{-2}$, and even more preferably between $1.5 \times 10^{-2}$ and $5.5 \times 10^{-2}$, or (expressed in watt-hours/kilogram of dough) is between 10 Wh/kg and 40 Wh/kg, and even more preferably between 12 Wh/kg and 30 Wh;

Pe2:
(expressed in watts/min/gram of dough) is between $10^{-3}$ and $10^{-1}$, preferably between $1 \times 10^{-2}$ and $7 \times 10^{-2}$, and even more preferably between $1.5 \times 10^{-2}$ and $8.5 \times 10^{-2}$;

or (expressed in watt-hours/kilogram of dough) is between 30 Wh/kg and 100 Wh/kg, and even more preferably between 55 and 75 Wh/kg.

The baking step of the method according to the invention may advantageously be carried out:

either in static "batch" mode using a microwave oven in which the bakery products are put in the oven in batches and in sequences, or in dynamic (continuous) mode, for example using a tunnel microwave oven in which the bakery products circulate at a continuous given speed by virtue of conveying means.

In the static mode, the duration of the heating/baking phases is, with the power emitted, an important variable.

Advantageously in the static mode, the duration D1 of this microwave heating/baking phase 1 is less than or equal to the duration D2 of the microwave heating/baking phase 2.

For example, for a piece of dough weighing between 600 and 700 g, the duration D1 of this microwave heating phase 1 (expressed in seconds) in the static mode is between 60 and 300, preferably between 20 and 90, more preferably between 25 and 60, and even more preferably between 30 and 40, while the duration D2 of this baking phase 2, expressed in seconds, is, in increasing order of preference: between 30 and 180, between 30 and 160, between 30 and 150, between 60 and 120, between 65 and 120, and between 60 and 90.

In the dynamic mode, the duration of the heating/baking phases is dependent on the speed at which the bakery products are conveyed in the tunnel oven.

Moreover, still in the dynamic mode, it appeared to be preferable to essentially adjust the conveying speed variable and the emitted power variable in various successive zones of the tunnel oven corresponding to the baking/heating phases in order to control the heating/baking of the bakery products.

In the dynamic mode, the transit times D1, D2 for the bakery products in the various successive zones of the tunnel oven corresponding to the baking/heating phases are, for example, substantially of the same order. It is Pe which varies in these zones.

According to one preferred embodiment, the baking step comprises another advantageous supplementary step, i.e. a phase 3 of baking by means of microwaves with an emission power Pe3:

such that the emission power Pe3 (expressed in watts/min/gram of dough) is between $10^{-3}$ and $10^{-1}$, preferably between $1 \times 10^{-2}$ and $3 \times 10^{-2}$, and even more preferably between $1.5 \times 10^{-2}$ and $2.5 \times 10^{-2}$;

such that the emission power Pe3 (expressed in watt-hours/kilogram of dough) is between 15 Wh/kg and 75 Wh/kg, and more preferably between 30 and 40 Wh/kg;

given, moreover, that P1≤P2 and preferably Pe1≤Pe2≤Pe3.

The nominal set power P3 may be such that P2≤P3 or P3≤P2, preferably P2≤P3.

In any event, the sum of the powers emitted by these 3 baking phases is advantageously less than the total power of between 70 Wh/kg and 110 Wh/kg, preferably between 75 Wh/kg and 85 Wh/kg.

The curve of microwave baking resulting from these three phases with increasing emission powers Pe1, Pe2 and Pe3, combined with baking durations D1, D2 and D3 which may or may not be variable for a given dough piece mass, is particularly suitable for breadmaking products in molds made of a heat-resistant polymer, for example of poly (cyclohexylene-dimethylene terephthalate).

This baking protocol takes into account the duration, the power and the weight of the dough.

The baking protocol advantageously used in the invention judiciously takes advantage of the moment when the soft part is flexible in order to develop (increase the volume of) the breadmaking product.

All the trouble in fact lies in avoiding the soft part setting firm, and thus having a satisfactory development while at the same time making it possible to stabilize the structure of the bread once the development has reached its optimum.

Advantageously in the static mode, the duration D3 of this supplementary microwave heating/baking phase is less than or equal to the duration D1 of phase 1. Hence, it follows that D2≥D1≥D3 is preferable.

For example, for a dough piece weighing between 600 and 700 g, the duration D3 of this microwave heating/baking phase 3 can be defined as follows (D3 expressed in seconds): D3, in increasing order of preference: between 30 and 180, between 60 and 150, between 80 and 120, between 15 and 90, between 30 and 90, and between 30 and 75.

In the dynamic mode, D1, D2 and D3 are, for example, substantially of the same order. Pe1, Pe2 and Pe3 and the conveying speed are adjusted.

Advantageously, an optional phase Po of heating by conventional heating means other than microwaves (for example, conventional convection bakery ovens, deck ovens or patisserie ovens which may or may not be ventilated), consisting in placing the thermal plastic polymer mold containing the dough in a heated chamber (preferably a convection oven) having a temperature To which is below the melting point of the thermal polymer of which the mold is made, and which is between 100 and 300° C., preferably between 150 and 250° C., may be carried out.

This optional phase Po of conventional heating may take place before and/or after phases 1, 2 or even 3.

The baking of the dough leads to the evaporation of a portion of the water present in the dough, thereby producing humidity in the baking chamber. In practice, several possibilities can be envisioned concerning the control of this humidity in the baking chamber, during at least one of the baking phases (for example, 1 to 3 and Po). By way of examples, mention may be made of the possibilities -a-, -b-, -c- and -d- hereinafter.

-a- No action is taken with regard to the humidity of the baking chamber, such that the baking chamber can optionally reach saturation in terms of humidity.

-b- The humidity of the baking chamber is modified by adding steam.

-c- The humidity of the baking chamber is modified by evacuating all or a portion of the steam present in the baking chamber, for example by means of chimneys traditionally known in the bakery trade as "ouras" ["dampers"].

-d- The humidity of the baking chamber is modified by adding steam and by evacuating all or a portion of the steam present in the baking chamber, for example by means of chimneys conventionally known in the bakery trade as "ouras" ["dampers"]

Even more preferably, the parameters Pe1, Pe2 and Pe3 selected for obtaining a crustless baked bread having all the desired characteristics are, for example, the following:
0.02 w/min/g or 20 Wh/kg phase 1
0.04 w/min/g or 25 Wh/kg phase 2 (evacuation of humidity)
0.02 w/min/g or 35 Wh/kg phase 3 (evacuation of humidity).

These powers are given for a bread having, for example, a mass of between 30 and 3000 g.

In this preferred embodiment, the nominal set powers P1, P2 and P3 are chosen such that P1≤P2, and preferably P2≤P3.

In accordance with the invention, the baked bakery product, in particular the baked batch bread or the like, obtained at the end of the method, is crustless.

For the purpose of the invention, the expression "crust" corresponds, for example, to:
- a dried-out, therefore rigidified or vitrified, thin outer layer having a thickness, for example, of greater than or equal to 1 mm, preferably greater than or equal to 0.5 mm, and optionally colored by Maillard reactions, i.e. reactions containing significant amounts of characteristic components derived from the Maillard reaction (melanoids) and/or by caramelization,
- or a dried-out, therefore rigidified or vitrified, thin outer layer having a thickness, for example, of less than or equal to 1 mm, preferably less than or equal to 0.5 mm, and colored by Maillard reactions, i.e. reactions containing significant amounts of characteristic components derived from the Maillard reaction (melanoids) and/or by caramelization.

The resulting baked product has an outer surface that is visually similar to the inner structure, i.e. the soft part.

According to one advantageous arrangement of the invention, the baked bakery product, in particular the baked batch bread or the like, obtained at the end of the method, has a texture and a flexibility such that the slices that can be cut from said bakery product can be rolled up on themselves. For example, a slice (thickness, for example, 0.5 cm-4.0 cm) of batch bread obtained by the method of the invention can be rolled up on itself without breaking or tearing.

According to another advantageous particularity of the invention, the composition of the dough is the following (in parts by weight):

| flour | 100 |
|---|---|
| water | 50-60 |
| sugar | 1-15 |
| yeast | 2-5 |
| fat | 1-15 |
| additives | 0-5 |

Finally, in the event that the dough intended to be baked is subjected beforehand to a fermentation treatment enabling it to rise, said fermentation can optionally be activated by exposure of the dough to a microwave source, with an emission power Pef such that the increased temperature induced at the core of the dough is, for example, less than or equal to the temperature of inactivation of the yeast.

Preferably, the temperature induced at the core of the dough for this microwave activation is between 30° C. and 50° C., and even more preferably between 36 and 42° C. This microwave-activation phase is advantageously carried out simultaneously with a conventional fermentation in a temperature-climatized (25 to 50° C., preferably 30° to 42° C.) and hygrometry-climatized (60% to 99% ERH, preferably 70% to 95% ERH) chamber.

Advantageously, the phase of activation of the fermentation by exposure to microwaves can make it possible to reduce the duration of the fermentation phase, for example by 25% to 75%.

For example, for a dough piece weighing between 600 and 700 g, the duration Df of this phase of activation of the fermentation by exposure to microwaves (expressed in minutes) is between 10 and 50, preferably between 10 and 35, and even more preferably between 15 and 25

The examples which follow make it possible to understand the role of the invention more clearly, and illustrate exemplary embodiments of the method according to the invention.

EXAMPLES

Examples 1 to 7

Static Mode

The dough used in the examples which follow has the following composition:

| flour | 100 |
|---|---|
| water | 56 |
| yeast | 3.5 |
| sugar | 11 |
| salt | 2 |
| vegetable fat | 4 |
| soft improver additives (emulsifier, hydrocolloids) | 1 |
| technological additives (oxidizing agent, alpha-amylase, reducing agent) | 0.5 |
| microbiological storage additives | 0.5 |

The preparation of this dough comprises the following steps:
kneading in a "spiral" kneading machine for 4 min at slow speed plus 10 min at fast speed,
shaping in the shape of a quenelle 30 cm long and placing in a mold,
fermentation in a climatized oven (hygrometry 85% and temperature 35° C.).

The material used for the microwave baking is a SAMSUNG M192 DN microwave oven for implementation in the batch mode (static mode).

For the optional steps of baking by conventional means, a BONGARD electric deck oven is used in the following examples.

The mold used is a DuPont THERMX PCT mold that is parallelepipedal in shape and has the dimensions: top length of 300 mm, bottom length of 285 mm; height of 85 mm; bottom width of 10 cm, top width of 11 cm.

According to the invention, the mold is pierced with 55 holes of 3 mm per face. The edges of the mold have also been pierced with 3 mm perforations every 2 cm.

The amount of dough per mold is 660 g.

Table 1 below gives the baking protocols for Examples 1 to 5 and 7 and for counterexample 6, and also the results obtained.

TABLE 1

| Examples | BAKING PROTOCOL | RESULTS |
|---|---|---|
| 1 | MW: D1 = 2'; P = 450, i.e. Pe1 = 0.02 watts/min/gram of dough, i.e. 20 Wh/kg of dough MW: D2 = 1'30; P = 850, i.e. Pe2 = 0.05 watts/min/gram of dough, i.e. 50 Wh/kg of dough Po: deck oven: 3' at 220° C. with evacuation of the humidity by opening the "damper" provided on the oven | Surface hardening Medium development Toasted zones (browning) on the inside Correct exterior appearance |
| 2 | MW: D1 = 2'30"; P = 450, i.e. Pe1 = 0.03 watts/min/gram of dough, i.e. 30 Wh/kg of dough MW: D2 = 1'; P = 850, i.e. Pe2 = 0.02 watts/min/gram of dough, i.e. 20 Wh/kg of dough Po: ventilated patisserie oven: 5' at 180° C. with evacuation of the humidity by opening the "damper" provided on the oven | Surface hardening Medium development No toasted zones (browning) on the inside Correct exterior appearance |
| 3 | Po: ventilated patisserie oven: 4' at 150° C. with saturation of the oven chamber with the humidity produced by the dough MW: D1 = 1'30"; P = 450, i.e. Pe1 = 0.02 watts/min/gram of dough, i.e. 20 Wh/kg of dough MW: D2 = 2'; P = 850, i.e. Pe2 = 0.04 watts/min/gram of dough, i.e. 40 Wh/kg of dough | Surface hardening Good development Toasted zones (browning) on the inside Correct exterior appearance |
| 4 | MW: D1 = 5'; P = 450, i.e. Pe1 = 0.06 watts/min/gram of dough, i.e. 60 Wh/kg of dough MW: D2 = 1'; P = 1000, i.e. Pe2 = 0.02 watts/min/gram of dough, i.e. 20 Wh/kg of dough | Very slight surface hardening Good development Very correct exterior appearance |
| 5 | MW: D1 = 2'; P = 300, i.e. Pe1 = 0.02 watts/min/gram of dough, i.e. 20 Wh/kg of dough MW: D2 = 2'; P = 850, i.e. Pe2 = 0.04 watts/min/gram of dough, i.e. 40 Wh/kg of dough MW: D3 = 1'30"; P = 450, i.e. Pe3 = 0.02 watts/min/gram of dough, i.e. 20 Wh/kg of dough | No surface hardening Good development Very correct exterior appearance |
| Counterexample 6 | MW: D1 = 1'30"; P = 850, i.e. Pe1 = 0.03 watts/min/gram of dough, i.e. 30 Wh/kg of dough MW: D2 = 3'45"; P = 450, i.e. Pe2 = 0.04 watts/min/gram of dough, i.e. 40 Wh/kg of dough MW: D3 = 2'; P = 450, i.e. Pe3 = 0.03 watts/min/gram of dough, i.e. 30 Wh/kg of dough | No surface hardening Correct strength Medium development Medium exterior appearance Soft part too firm. Firmness of the soft part: 1.77 |
| 7 | MW: D1 = 2'; P = 300, i.e. Pe1 = 0.02 watts/min/gram of dough, i.e. 20 Wh/kg of dough MW: D2 = 3'45"; P = 450, i.e. Pe2 = 0.04 watts/min/gram of dough, i.e. 40 Wh/kg of dough MW: D3 = 1'30"; P = 850, i.e. Pe3 = 0.03 watts/min/gram of dough, i.e. 30 Wh/kg of dough | No surface hardening Very good development. Very good strength Correct exterior appearance. Very correct result for the soft part: moist. Firmness of the soft part: 0.96 |

Legend: MW means microwaves, P (in watts) corresponds to the set power of the MW oven and Po represents an optional phase of conventional oven baking, which is carried out before or after the MW baking in the example under consideration. D1, D2 and D3 in minutes ' seconds ".

The term "development" denotes the increase in volume of the dough piece.

The term "strength" denotes the deformation of the walls of the batch bread after baking.

The values of firmness of the soft part are given in Newtons and are obtained by measuring using a Lloyds texturometer.

During baking, the steam produced was able to escape via the perforations made in the mold and did not accumulate in the very small space between the walls of the mold and the dough.

After baking and immediately after removal from the oven, a jet of compressed air at a pressure of 4 bar is applied, for a brief period of a few seconds, to all the faces of the molds containing the baked products obtained. The compressed air that is introduced into the perforations made in the mold makes it possible to detach the baked product from the walls of the mold.

Next, the step of cooling the bread in the mold consists in applying, to all the faces of the mold, a jet of air at a pressure of 1 bar, in such a way as to wash over the faces of the mold so as to evacuate the steam escaping from the perforations. The baked product is thus cooled more rapidly in the mold and no formation of starch paste is observed between the walls of the mold and the baked product. The baked product, which has a core temperature of less than 70° C., is then very easily demolded. Since it is already cooled, it can also be handled without risk of burning.

By way of comparison, the same tests were carried out, but without using a perforated mold. In all cases, the baked products are very difficult to demold, since the products adhere to the walls of the mold.

Example 8

Dynamic Mode

The dough used in the examples which follow has the following composition:

| | |
|---|---|
| flour | 100 |
| water | 56 |
| yeast | 5 |
| sugar | 11 |
| salt | 2 |
| vegetable fat | 3 |
| soft improver additives (emulsifier, hydrocolloids) | 1 |
| technological additives (oxidizing agent, alpha-amylase, reducing agent) | 0.5 |
| microbiological storage additives | 0.5 |

The preparation of this dough comprises the following steps:
- kneading in a "spiral" kneading machine for 4 min at slow speed plus 10 min at fast speed,
- shaping in the shape of a quenelle 30 cm long and placing in a mold,
- fermentation in a climatized oven (hygrometry 85% and temperature 35° C.).

The material used for the microwave baking: a tunnel equipped with 10 microwave generators distributed in 3 baking zones
Zone 1: two 0.8 Kw generators
Zone 2: two 0.8 Kw generators+two 1.2 Kw generators
Zone 3: four 1.2 Kw generators.

The mold used is a DuPont THERMX PCT mold with a parallelepipedal shape and having the dimensions: length 235 mm; height 117 mm; width 125 mm.

According to the invention, the mold is pierced with approximately 450 holes of 2 mm. The edges of the mold were also pierced with 2 mm perforations every 1.5 cm.

The amount of dough per mold is 570 g.

The detaching step is carried out in a stainless steel casing pressurized with compressed air (pressure of 4 bar), which enables the introduction of air via all the holes pierced in the mold.

The bread is cooled in its mold on an assembly composed of a frame containing a France Air fan, 1400 rpm, power 1500 W, enabling 4 breads to be cooled simultaneously.

This oven is a tunnel oven which operates with a line comprising various successive zones corresponding to nominal powers P1, P2 and P3 and emitted powers Pe1, Pe2 and Pe3.

Table 2 below gives the baking protocols and also the results obtained for the present example 8.

TABLE 2

| Example | BAKING PROTOCOL | RESULTS |
|---|---|---|
| 8 | Total power 80 Wh/kg P1: 1.6 Kw D1: 30' Pe1: 12 Wh/kg P2: 4.2 Kw D2: 33' Pe2: 32 Wh/kg P3: 4.8 Kw D3: 33' Pe3: 35 Wh/kg Detaching in a casing brought to 4 bar for approximately 1 second. Cooling in the mold for 10 min. Slow cooling at ambient temperature for 120 min. Loss of water during the various phases of the method. Baking approximately: 2.5% Cooling in the mold: 4% Slow cooling: 2% Final water content of the bread 36.5% | Correct exterior appearance, no crust, no hard zone. Firmness value measured with a texturometer at D + 7: 0.80 N. Product tasted by a jury of experts, having the characteristics of a soft bread. Identical to a bread baked by conventional baking |

The method according to the invention is simple and economical to implement in an industrial environment and makes it possible to obtain bakery products, in particular crustless batch breads or the like, baked by means of microwaves, which demold easily, which have an attractive appearance, and which have organoleptic qualities comparable to conventionally baked bakery products.

The invention claimed is:

1. A method of producing a crustless bakery product, said method consisting essentially of:
    preparing a dough,
    optionally fermenting said dough,
    placing the dough in a mold having walls and edges, and which includes means for evacuating steam produced during and after baking, wherein said means for evacuating steam comprises perforations distributed all over the walls of the mold, said perforations having a diameter of between 1 and 5 mm and representing between 0.1 and 10% of the wall surface,
    performing at least one step of baking the dough present in the mold by microwaving,
    optionally performing another step of baking by other baking means, thereby producing a crustless bakery product,
    detaching the resulting crustless bakery product from the walls of the mold by applying a pressurized gas jet to the faces of the mold and which enters into the mold through said perforations,
    optionally cooling the crustless bakery product and/or the mold, and
    demolding the crustless bakery product without damaging the integrity of the crustless bakery product,
    wherein said mold is made from a non-fibrous bulk structure of a heat-resistant plastic polymer.

2. The method of claim 1, wherein perforations are also made in all or a portion of the edges of the mold, at a rate of one perforation every 4 cm+/−0.5 cm.

3. The method of claim 1, wherein perforations are also made in all or a portion of the edges of the mold, at a rate of one perforation every 1.5 cm+/−0.5 cm.

4. The method of claim 1, wherein the crustless bakery product and/or the mold is cooled by means of a cooling gas jet and/or alternatively by means of a ventilation system which diffuses a stream of air.

5. The method of claim 1, wherein the at least one step of baking by microwaving consists essentially of using a total power of between 70 Wh/kg and 110 Wh/kg.

6. The method of claim 1, wherein the at least one step of baking by microwaving consists essentially of:
    carrying out a first phase of baking the dough present in the mold by microwaving with a nominal power P1, comprising
    an emission power Pe1, expressed in watts/min/gram of dough, is between $10^{-3}$ and $10^{-1}$; or an emission power Pe1, expressed in watt-hours/kilogram of dough, is between 10 Wh/kg and 40 Wh/kg; and subsequently carrying out a second phase of baking by microwaving with a nominal power P2, comprising an emission power Pe2, expressed in watts/min/gram of dough, is between $10^{-3}$ and $10^{-1}$; or an emission power Pe2, expressed in watt-hours/kilogram of dough, is between 30 Wh/kg and 100 Wh/kg;

and wherein P1<=P2.

7. The method of claim 6, wherein the at least one step of baking further consists essentially of a third phase of baking by microwaving with a nominal power P3, comprising an emission power Pe3, expressed in watts/min/gram of dough, is between $10^{-3}$ and $10^{-1}$; or an emission power Pe3, expressed in watt-hours/kilogram of dough, is between 15 Wh/kg and 75 Wh/kg;

and wherein P1<=P2.

8. The method of claim 6, further consisting essentially of heating by conventional heating means other than microwaves, consisting essentially of placing the heat-resistant plastic polymer mold containing the dough in a heated chamber having a temperature which is below the melting point of the heat-resistant plastic polymer from which the mold is made, and wherein said temperature is between 100° C. and 300° C.

9. The method of claim 1, wherein the at least one step of baking is in a baking chamber, and during the at least one step of baking, humidity is modified by adding steam and/or by evacuating all or a portion of the steam present in the baking chamber by chimneys.

10. The method of claim 1, wherein the crustless bakery product obtained at the end of the method has a texture and a flexibility such that slices cut from said crustless bakery product can be rolled up on themselves.

11. The method of claim 1, wherein the composition of the dough is the following in parts by weight:

| | |
|---|---|
| flour | 100 |
| water | 50-60 |
| sugar | 1-15 |
| yeast | 2-5 |
| fat | 1-15 |
| additives | 0-5. |

12. The method of claim 1, further consisting essentially of a fermentation of the dough prior to baking, said fermentation is activated by exposure of the dough to a microwave source with an emission power Pef, wherein an increased temperature induced at the core of the dough is less than or equal to the temperature of inactivation of the yeast, wherein the temperature induced at the core of the dough for this microwave activation being between 30° C. and 50C, and wherein the hygrometry being between 60 and 99% Equilibrium Relative Humidity (ERH).

13. The method of claim 1, wherein said perforations are distributed homogeneously over all of the walls of the mold.

* * * * *